United States Patent [19]

Nitou et al.

[11] Patent Number: 4,566,425

[45] Date of Patent: Jan. 28, 1986

[54] IGNITION SYSTEM OF THE CONDENSOR-DISCHARGE TYPE FOR INTERNAL COMBUSTION ENGINE

[75] Inventors: Hiroyasu Nitou, Fuji; Kiyoshi Shirai; Osamu Takahashi, both of Numazu, all of Japan

[73] Assignee: Kokusan Denki Co., Ltd., Shizuoka, Japan

[21] Appl. No.: 626,922

[22] Filed: Jul. 2, 1984

[51] Int. Cl.$^4$ ................................................ F02P 9/00
[52] U.S. Cl. ................................... 123/600; 123/602; 123/603
[58] Field of Search ............... 123/600, 602, 603, 335

[56] References Cited

U.S. PATENT DOCUMENTS

| | | | |
|---|---|---|---|
| 3,669,086 | 6/1972 | Beuk et al. | 123/600 |
| 3,704,701 | 12/1972 | Struber | 123/599 |
| 3,911,886 | 10/1975 | Nagasawa | 123/603 |
| 4,202,305 | 5/1980 | Wolf | 123/599 |
| 4,343,273 | 8/1982 | Kondo et al. | 123/600 |
| 4,449,497 | 5/1984 | Wolf et al. | 123/335 |

*Primary Examiner*—Andrew M. Dolinar
*Attorney, Agent, or Firm*—Pearne, Gordon, Sessions, McCoy, Granger & Tilberry

[57] ABSTRACT

An ignition system of the condensor-discharge type for an internal combustion engine is disclosed which is capable of preventing delay of the ignition position at a high engine speed due to an armature reaction and preventing generation of ignition spark at reverse rotation of the engine without using a signal coil for determining the ignition position.

8 Claims, 5 Drawing Figures

IGNITION SYSTEM OF THE CONDENSOR-DISCHARGE TYPE FOR INTERNAL COMBUSTION ENGINE

BACKGROUND OF THE INVENTION

1. Field of the Invention

This invention relates to an ignition system for an internal combustion engine, and more particularly, an ignition system of the condensor-discharge type for an internal combustion engine, which ignition system does not use a signal coil for determining the ignition position.

2. Description of the Prior Art

An ignition system of the condensor-discharge type for an internal combustion engine which has been conventionally used in the art is constructed in such a manner that condensor is charged by means of the half wave output having positive polarity from an exciter coil provided in a magneto and a discharge control thyristor is turned on when a turn-on signal or gate signal is provided utilizing the half wave output having negative polarity generated from the exciter coil subsequent to the half wave output, so that the condensor may be discharged through the thyristor to the primary winding of an ignition coil to carry out the ignition operation.

Such a conventional ignition system of the condensor-discharge type has an advantage of rendering the structure of a magneto to be installed in an engine simple because it can eliminate the provision of a signal coil required to determine the ignition position. However, in the conventional ignition system, an electric current flows from the exciter coil to the condensor during the positive half wave output of the exciter coil to cause an armature reaction to appear in the exciter coil, so that the rising of a wave form of the negative half wave output generated from the exciter coil subsequent thereto is delayed resulting in the ignition position of an engine being delayed. Such defect is substantially increased with the increase in engine speed (rpm), to thereby cause the relationship between the ignition position $\theta_i$ and the engine speed N in the conventional ignition system of such type to be as shown in FIG. 5. Thus, it will be noted that the conventional ignition system has a disadvantage that the ignition position is substantially delayed at a high engine speed. In FIG. 5, the axis of ordinates designates an angle of the ignition position of an engine, supposing that an angle of the ignition position at the normal engine speed of 3000 rpm based on the top dead point of the engine is defined to be 0 degree.

Also, in the conventional ignition system of such type, the ignition operation is carried out also during the reverse rotation of the two-cycle engine, because a turn-on signal is supplied to the thyristor to discharge the condensor also when the engine is reversely rotated; thus, it is not suitable for use as an ignition system for a two-cycle engine.

SUMMARY OF THE INVENTION

The present invention has been made in view of the foregoing disadvantages of the prior art.

Accordingly, it is an object of the present invention to provide an ignition system of the condensor-discharge type for an internal combustion engine, which ignition system which is capable of rendering the structure significantly simple by eliminating the provision of a signal coil used to determine the ignition position, and effectively preventing delay of the ignition position at a high engine speed due to an armature reaction.

It is another object of the present invention to provide an ignition system of the condensor-discharge type which is capable of effectively preventing the generation of ignition spark at reverse rotation of the engine to prevent the ignition operation at the reverse rotation.

It is a further object of the present invention to provide an ignition system of the condensor-discharge type which is capable of stopping the ignition operation when the engine speed is above a predetermined level, to thereby prevent overspeed of the engine.

In accordance with the present invention, there is provided an ignition system of the condensor-discharge type for an internal combustion engine comprising an ignition coil having a primary winding and a secondary winding; an exciter coil arranged in a magneto which is adapted to be rotated in synchronism with the rotation of an internal combustion engine, said exciter coil being adapted to generate output voltages each comprising a first half wave voltage of negative polarity, a second half wave voltage of positive polarity and a third half wave voltage of negative polarity in order at predetermined angular intervals when said engine is rotated in the positive direction; an ignition energy accumulating condensor arranged on the primary winding side of said ignition coil to be charged to have one polarity by said second half wave voltage generated from said exciter coil; a discharge control thyristor provided to allow said ignition energy accumulating condensor to be discharged through said primary winding of said ignition coil when it is turned on; a turn-on signal supply circuit for supplying a turn-on signal to said thyristor by means of said half wave voltages of negative polarity at the ignition position of said engine; a signal control condensor charged to have one polarity by said second half wave voltage generated from said exciter coil; a signal control thyristor provided to substantially short-circuit the output of said exciter coil when it is turned on and adapted to allow the anode-cathode circuit thereof to be biased in the forward direction by said first and third half wave voltages; and a discharge circuit for permitting said signal control condensor to be discharged through the gate-cathode circuit of said signal control thyristor.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters designate like or corresponding parts throughout, wherein.

DETAILED DESCRIPTION OF THE PREFERRED EMBODIMENT

Now, an ignition system of the condensor-discharge type for an internal combustion engine according to the present invention will be described by way of example with reference to the accompanying drawings.

Figure 1:
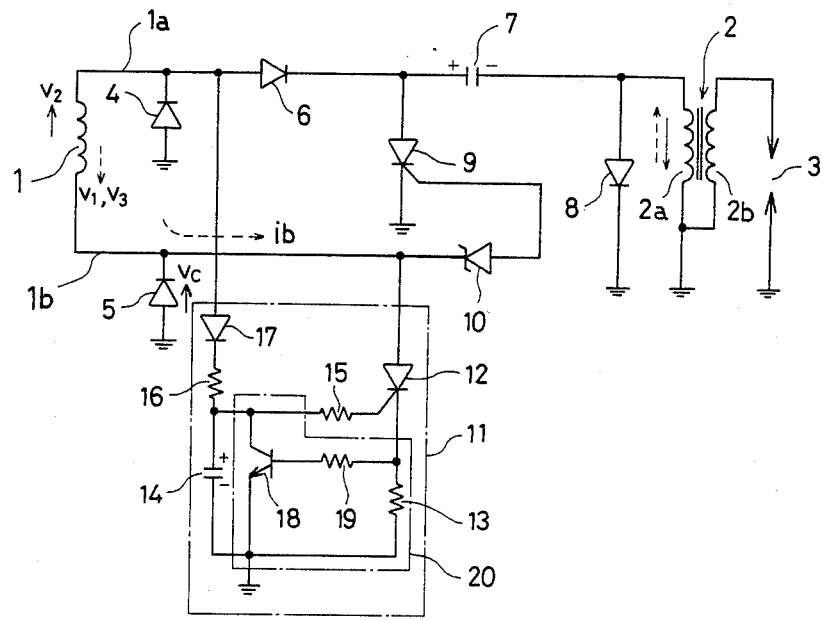
FIG. 1 is a wiring diagram showing a circuit of an embodiment of an ignition system of the condensor-discharge type according to the present invention.

FIG. 1 is a wiring diagram showing an electric circuit of an embodiment of an ignition system for an internal combustion engine of the condensor-discharge type according to the present invention. In FIG. 1, reference numeral 1 designates an exciter coil arranged in a magneto adapted to be rotated in synchronism with an internal combustion engine, reference numeral 2 designates an ignition coil including a primary winding 2a and a secondary winding 2b. The primary and secondary windings 2a and 2b are connected at one ends thereof together and earthed. Reference numeral 3 indicates an ignition plug which is connected to the secondary winding. The ignition plug 3 is mounted on a cylinder of an internal combustion engine (not shown). To both ends 1a and 1b of the exciter coil 1 are respectively connected the cathodes of diodes 4 and 5, the anodes of which are earthed. To one end 1a of the exciter coil 1 is connected the anode of a diode 6, of which the cathode is connected at one end thereof to one end of a condensor 7 for accumulating ignition energy therein. The condensor 7 is connected at the other end thereof to the terminal of the primary winding 2a on the nongrounded side thereof and also to the anode of a diode 8. The diode 8 is earthed at the cathode thereof. The connection between the cathode of the diode 6 and the condensor 7 is connected thereto the anode of a thyristor 9 for controlling discharge of the condensor 7, of which the cathode is earthed. The gate of the thyristor 9 is connected thereto the anode of a Zener diode 10, of which the cathode is connected to the other end 1b of the exciter coil 1. The diode 4 and Zener diode 10 constitute a turn-on supply circuit which serves to supply a turn-on signal to the thyristor 9 by means of a half wave output of negative polarity induced across or generated from the exciter coil 1. When voltage in the direction of an arrow indicated by dotted lines in FIG. 1 may be induced across the exciter coil 1 and the voltage is above the Zener level of the Zener diode 10, a turn-on signal is supplied to the thyristor 9 utilizing a path of from the exciter coil 1 through the Zener diode 10, the gate-cathode circuit of thyristor 9 and the diode 4 to the exciter coil 1. The word "polarity" referred to herein in connection with the output of the exciter coil 1 is used to mean that the polarity of the half wave output utilized for charging the condensor 7 is "positive" and that of the half wave output used for supplying a turn-on signal to the thyristor 9 is "negative".

For the purpose of controlling the supply of a turn-on signal to the thyristor 9, the ignition system of the embodiment illustrated includes a signal control circuit 11. The signal control circuit 11 includes a thyristor 12 connected at the anode thereof to the other end 1b of the exciter coil 1, of which the cathode is earthed through a resistor 13 having a low resistance. The thyristor 12 is provided to carry out substantial short-circuiting of the output voltage of negative polarity generated from the exciter coil 1 when it is turned on. The thyristor 12 has a possibility of being conductive for a period of time during which the output voltage of negative polarity from the exciter coil 1 is applied across the anode-cathode circuit of the thyristor 12 in the forward direction thereof. The signal control circuit 11 also includes a signal control condensor 14 which is connected at one end thereof to the ground potential and at the other end thereof via a resistor 15 to the gate of the thyristor 12. The connection between the condensor 14 and the resistor 15 is connected to the cathode of a diode 17 through a resistor 16, with the anode of the diode 17 being connected to the one end 1a of the exciter coil 1. Thus, the signal control condensor 14 is charged to have such a polarity as shown in FIG. 1 through the diode 17 and resistor 16, when output voltage of positive polarity shown in FIG. 1 (output voltage $V_2$ in the direction of an arrow indicated by a solid line) is induced across the exciter coil 1. The resistors 15 and 13 constitute together a first discharge circuit for allowing the condensor 14 to be discharged through the gate-cathode circuit of the thyristor 12, so that the condensor 14 may be discharged utilizing a path of from the resistor 15 through the gate-cathode circuit of the thyristor 12 and the resistor 13 to the condensor 14 to supply a turn-on signal to the thyristor 12. The condensor 14 has one end thereof on the nongrounded side connected to the collector of a transistor 18 of which the emitter is earthed, and the base of the transistor 18 is connected via a resistor 19 to the terminal of the resistor 13 on the nongrounded side or the connection between the resistor 13 and the cathode of the thyristor 12. The transistor 18 is provided in order to discharge the condensor 14. More particularly, the transistor 18 constitutes a second discharge circuit or a reset circuit in cooperation with the resistors 19 and 13 which acts to discharge the condensor 14 for a period of time during which the thyristor 12 is turned on.

Figure 2:
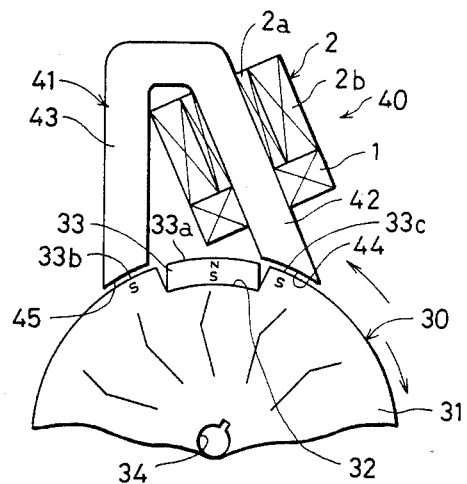
FIG. 2 is a front elevation view partial in section showing an example of a magneto used in the present invention from which a part thereof is eliminated for clarity in the description.
Figure 3:
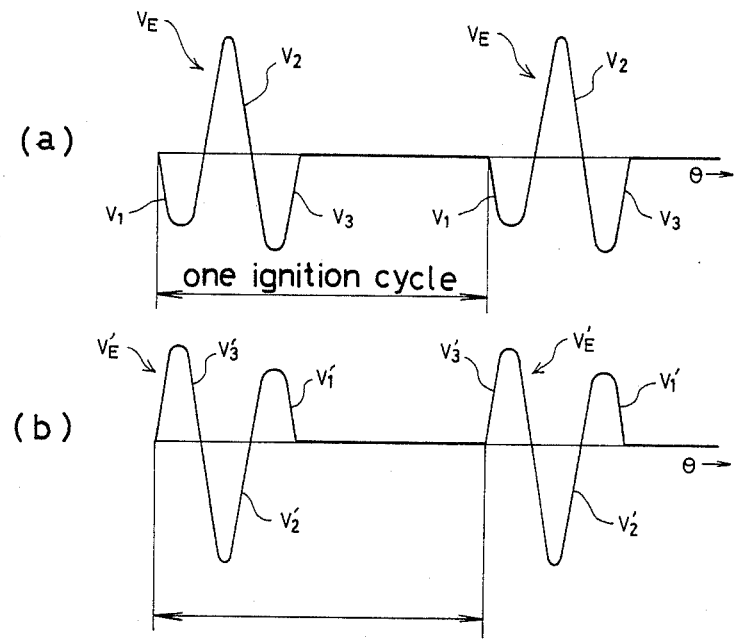
FIGS. 3(a) and 3(b) are wave diagrams showing the output voltages of an exciter coil obtained when the magneto of FIG. 2 is rotated in the positive direction and the reverse direction, respectively.

In the ignition system of the illustrated embodiment constructed in the manner described above, the exciter coil 1, when the engine is rotated in the positive direction, generates output voltages $v_E$, FIG. 3, each comprising a first half-wave voltage $v_1$ of negative polarity, a second half-wave voltage $v_2$ of positive polarity and a third half-wave voltage $v_3$ of negative polarity at predetermined angular intervals in sequence during one rotation of the magneto rotor. FIG. 2 shows one example of a magneto which is adapted to generate such output voltages. The magneto comprises a magnetic rotor 30 and a stator 40. The magnetic rotor 30 includes a rotor body 31 formed of a magnetic material and a magnet 33 fixed in a recess 32 formed at the periphery of the rotor body 31. The rotor body 31 has a hole 34 formed at the central portion thereof in which a part of a drive shaft such as an output shaft of an engine is loosely fitted. The magnet 33 is magnetized in the radial direction of the rotor 30 to form three magnetic poles for the rotor 30 consisting of a magnetic pole 33a appearing on the peripheral side of the magnet 33 (N pole in the illustrated example), magnetic poles appearing on both sides of the recess 32 (each S pole).

The stator 40 has a laminated core 41 formed into a substantially U-shape, of which the both legs 42 and 43 are respectively formed with pole faces 44 and 45 at the distal end portions thereof opposite to the S poles of the rotor 30 with a gap being defined between each of the pole faces and the S pole opposite thereto. The interval between the pole faces 44 and 45 of the core 41 is determined to be substantially equal to that between the magnetic poles 33b and 33c of the rotor, so that the pole faces 44 and 45 are allowed to be concurrently opposite to the poles 33b and 33c of the rotor, respectively. The core 41 has the ignition coil 2 wound on the leg 42 thereof comprising the primary winding 2a and secondary winding 2b and also has the exciter coil 1 wound thereon. The wave form of voltage induced across the exciter coil 1 in the magneto when the engine is rotated in the positive direction to allow the rotor 30 to be rotated in the positive direction or clockwise direction in FIG. 2 is shown in relation to the rotation angle in FIG. 3(a). As can be seen from FIG. 3(a), the induced voltage has a wave form in which output voltages each comprising voltage $v_1$ of negative polarity, voltage $v_2$ of positive polarity and voltage $v_3$ of negative polarity appear in sequence, and the wave form of this output voltage $v_E$ is generated once for each ignition cycle. The angular interval between one output voltage $v_E$ and the next output voltage $v_E$ or the angular interval from an angle at which one voltage $v_3$ of negative polarity reaches zero to that at the next voltage $v_1$ is induced is determined not to cause an armature reaction due to the generation of voltage $v_3$ of negative polarity to affect the rising of voltage $v_1$ of negative polarity or the time at which the voltage $v_1$ is generated. The words "one ignition cycle" used herein mean a period of time between one ignition and the next ignition in one cylinder of an engine; and, in the example shown in FIG. 2, this is equal to a period of time during which the rotor 30 is rotated once. FIG. 3(b) shows a wave form of voltage induced across the exciter coil 1 when the rotor 30 is rotated in the reverse direction or counter-clockwise direction in FIG. 2. As can be seen from FIG. 3(b), the induced voltage has a wave form wherein output voltages $v_E'$ each comprising half wave voltage $v_3'$ of positive polarity, half wave voltage $v_2'$ of negative polarity and half wave voltage $v_1'$ of positive polarity appear in order during one ignition cycle.

In the example of the magneto shown in FIG. 2, the ignition coil 2 is wound on the core 41, resulting in rotation of the rotor 30 inducing voltage across the ignition coil 2. The embodiment illustrated is adapted to allow voltage to be induced across the primary coil 2a of the ignition coil 2 which has a phase opposite to that of the output voltage of the exciter coil 1. More particularly, in FIG. 1, when the exciter coil 1 generates voltage $v_2$ of negative polarity in the direction indicated by the arrow of the solid line, voltage of negative polarity in the direction indicated by an arrow of the solid line in FIG. 1 is induced across the primary winding 2a of the ignition coil 2. In this respect, it is not essential to provide the ignition coil 2 in the magneto, and it may be arranged at the outside of the magneto.

Now, the manner of operation of the illustrated embodiment constructed as described above will be described with reference to the drawings.

Figure 4:
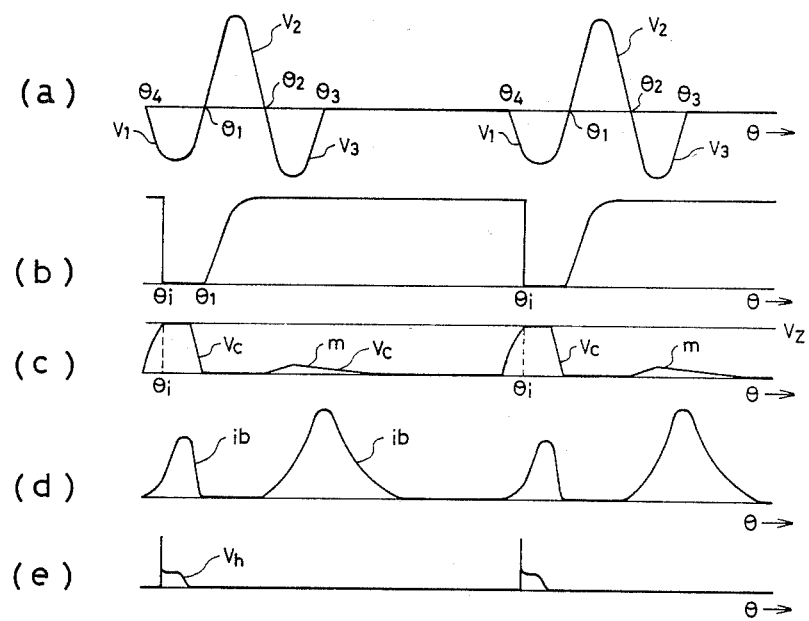
FIGS. 4(a) to 4(e) each are a wave form chart showing a wave form of voltage at each part of the embodiment shown in FIG. 1.
Figure 5:
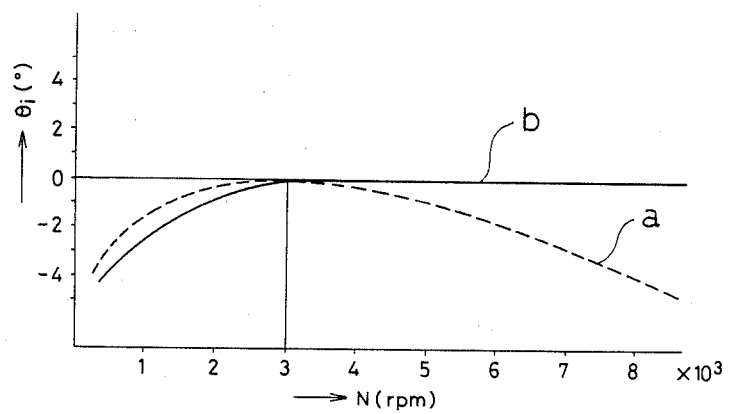
FIG. 5 is a diagrammatic view showing the characteristics of an ignition position with respect to an engine speed in each of an ignition system of the present invention and a conventional ignition system.

When the rotor 30 of the magneto shown in FIG. 2 is rotated in the positive direction, voltage which exhibits such a no-load wave form as shown in FIG. 4(a) with respect to the rotation angle is induced across the exciter coil 1. This wave form is the substantially same as that shown in FIG. 3(a). When the half wave voltage $v_2$ having positive polarity is induced across the exciter coil 1 at an angle of $\theta_1$, a current is allowed to flow through a path of from the exciter coil 1 via the diode 6, condensor 7, diode 8, and primary coil in 2a, in parallel, diode 5 to the exciter coil to permit the condensor 7 to be charged to have polarity shown in FIG. 1. At this time, voltage across both ends of the condensor 7 is varied as shown in FIG. 4(b). The voltage $v_2$ of positive polarity causes a current to flow through the diode 17, resistor 16, condensor 14 and diode 5, so that the signal control condensor 14 may be charged to have polarity shown in FIG. 1. When voltage $v_3$ of negative polarity is induced across the exciter coil 1 at an angle of $\theta_2$, the condensor 14 is concurrently discharged through a first discharge circuit comprising the resistor 15, the gate-cathode circuit of the thyristor 12 and the resistor 13; so that the so-obtained discharge current allows the thyristor 12 to be turned on. Actually, the condensor 14 starts to be discharged when voltage $v_2$ is past the peak. However, the first discharge circuit has a time constant determined to allow a gate current sufficient to turn on the thyristor 12 to be supplied to the thyristor 12 when voltage $v_3$ is induced, so that the thyristor 12 may be effectively turned on. The turning-on of the thyristor 12 allows a current $i_b$ (FIG. 4(d)) to flow from the exciter coil 1 through the thyristor 12 and resistor 13, resulting in both ends of the exciter coil 1 being substantially short-circuited. Accordingly, voltage applied across the Zener diode 10 (voltage $v_c$ across both ends of the diode 5) is below the Zener level as shown by reference character m in FIG. 4(c), so that a turn-on signal is not supplied to the thyristor 9. Voltage $v_3$ of negative polarity is actually delayed in the rising of a wave form thereof due to an armature reaction, thus, the current $i_b$ is caused to flow even at the position subsequent to the trailing position $\theta_3$ of no-load wave form of the voltage $v_3$. The turning-on of the thyristor 12 also causes voltage drop between both ends of the resistor 13, and voltage across both ends of the resistor 13 allows a current to flow to the base of the transistor 18 through the resistor 19. This results in the transistor 18 being turned on to permit the condensor 14 to be discharged through the collector-emitter circuit of the transistor 18. The thyristor 12 is kept at a turned-on state over the range of an angle of from $\theta_2$ to $\theta_3$ between which voltage $v_3$ of negative polarity is induced across the exciter coil 1. During this time, a current continues to flow to the base of the transistor 18, so that the discharge of the condensor 14 is completed before the half wave voltage $v_3$ of negative polarity terminates. Then, the first half wave voltage $v_1$ of negative polarity is induced across the exciter coil 1 at an angle of $\theta_4$; however, at this time, the condensor 14 does not have any charge. Thus, a turn-on signal is not supplied from the condensor 14 to the thyristor 12, resulting in the thyristor 12 being kept at a turned-off state. This allows the instantaneous value of voltage $v_1$ having negative polarity to be increased, so that a turn-on signal may be supplied to the thyristor 9 when voltage $v_c$ applied across the Zener diode 10 is above the Zener level at an angle of $\theta_i$. This results in the thyristor 9 being turned on to cause the condensor 7 to be rapidly discharged through the thyristor 9 and the primary winding 2a. The so-obtained discharge current causes high variation in magnetic flux to occur in the core of the ignition coil 2, so that high voltage $v_h$ (FIG. 4(e)) may be induced across both ends of the secondary winding 2b to allow the ignition plug 3 to generate spark to carry out the ignition of the engine. The crest value of voltage $v_1$ of negative polarity is increased with the increase in engine speed. This results in phase at which voltage $v_1$ reaches the Zener level of the Zener diode 10, so that the ignition position $\theta_i$ is advanced with the increase in engine speed. A curve (b) in FIG. 5 indicates the characteristics of the ignition position $\theta_i$ with respect to the engine speed N.

As described above, the conventional ignition system lacks a signal control circuit such as the circuit 11 in the present invention. The manner of operation of the conventional ignition system of such construction will be briefly described hereinafter with reference to FIG. 1.

In the conventional ignition system, voltage $v_3$ of negative polarity generated subsequent to voltage $v_2$ of positive polarity causes a turn-on signal to be supplied to the discharge control thyristor 9. The rising of voltage $v_3$ of positive polarity is delayed by an armature reaction due to a current for charging the condensor 7, resulting in the ignition position being delayed. Such delay of the ignition position is increased with the increase in engine speed as indicated by a curve (a) in FIG. 5.

On the contrary, the ignition system of the present invention, as described above, is adapted to supply a turn-on signal to the discharge control thyristor 9 by half wave voltage $v_1$ of negative polarity prior to half wave voltage $v_2$ of positive polarity (half wave voltage for charging the ignition energy accumulating condensor), so that the present invention may be not affected by the armature reaction. Thus, the present invention never causes the ignition position $\theta_i$ to be delayed, as indicated by a curve (b) in FIG. 5.

Now, supposing that the magnetic rotor 30 is rotated in the reverse direction in the magneto shown in FIG. 2, half wave voltage $v_3'$ of positive polarity is first generated in the exciter coil 1 as shown in FIG. 3(a), and then half wave voltage $v_2'$ of negative polarity is generated. Voltage $v_3'$ of positive polarity allows the condensor 14 as well as the condensor 7 to be charged, and charge accumulated in the condensor 14 serves to supply a turn-on signal to the thyristor 12. Accordingly, the thyristor 12 is turned on immediately after voltage $v_2'$ of negative polarity is generated subsequent to voltage $v_3'$ of positive polarity, to thereby prevent the supply of a turn-on signal to the thyristor 9. The condensor 14 completes discharge while voltage $v_2'$ of negative polarity is generated; however, when voltage $v_1'$ of positive polarity is then generated, the condensor 14 is charged by the voltage $v_1'$ again. The charging of the condensor is further promoted by voltage $v_3'$ of positive polarity generated subsequent thereto. Accordingly, the thyristor 12 is turned on also when voltage $v_2'$ of negative polarity is then generated, so that the supply of a turn-on signal to the discharge control thyristor 9 may be effectively prevented. Thus, it will be noted that, in the present invention, the ignition operation is not carried out at the reverse rotation of the magneto because a turn-on signal is never supplied to the thyristor 9 at this time, therefore, the application of the ignition system of the present invention to a two-cycle engine can effectively prevent the reverse rotation of the engine.

The embodiment described above is constructed in the manner such that the ignition energy accumulating condensor 7 is connected in series to the primary winding 2a of the ignition coil and the discharge control thyristor 9 is connected in parallel to a series circuit comprising the condensor 7 and the primary winding 2a. However, it should be noted that, in the present invention, it is merely required to allow the ignition circuit of the condensor discharge type to discharge the condensor 7 to the primary winding 2a. For example, the condensor 7 and thyristor 9 may be positionally replaced with each other in FIG. 1. Also, the diode 8 and Zener diode 10 may be eliminated.

Also, in the embodiment described above, the second discharge circuit or reset circuit 20 for the condensor 14 comprises the transistor 18. However, a thyristor may be substituted for the transistor 18. Alternatively, the reset circuit may comprise a resistor connected in parallel to both ends of the condensor 14 without using the transistor or thyristor. Further, the reset circuit may be eliminated, in the case that the condensor 14 can be substantially completely discharged through the resistor 15 and the gate-cathode circuit of the thyristor 12 before voltage $v_1$ is generated.

Furthermore, in the present invention, the discharge time constant of the first discharge circuit for the condensor 14 may be determined to allow charge to remain in the condensor 14 at the time of generation of voltage $v_1$ of negative polarity or at the time of leading of its wave form when the engine speed is above a predetermined engine speed level at the high speed. This effectively prevents overspeed of the engine because the ignition operation is not carried out above the predetermined engine speed.

As can be seen from the foregoing, the present invention can effectively prevent the delay of the ignition position at a high engine speed by eliminating adverse effect due to the armature reaction of the magneto. Also, it will be noted that the present invention can prevent the ignition operation at the reverse rotation of an engine.

It will thus be seen that the objects of the present invention set forth above, among those other objects made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An ignition system of the condensor-discharge type for an internal combustion engine, comprising:

an ignition coil having a primary winding and a secondary winding;

an exciter coil arranged in a magneto which is adapted to be rotated in synchronism with the rotation of an internal combustion engine, said exciter coil being adapted to generate output voltages each comprising a first half wave voltage of negative polarity, a second half wave voltage of positive polarity and a third half wave voltage of negative polarity in sequence at predetermined angular intervals when said engine is rotated in the positive direction;

an ignition energy accumulating condensor arranged on the primary winding side of said ignition coil to be charged to have one polarity by said second half wave voltage generated from said exciter coil;

a discharge control thyristor provided to allow said ignition energy accumulating condensor to be discharged through said primary winding of said ignition coil when it is turned on;

a turn-on signal supply circuit for supplying a turn-on signal to said thyristor by means of said half wave voltages of negative polarity at the ignition position of said engine;

a signal control condensor connected to be charged to have one polarity by said second half wave voltage generated from said exciter coil;

a signal control thyristor provided to substantially short-circuit the output of said exciter coil when it is turned on and adapted to allow the anode-cathode circuit thereof to be biased in the forward direction by said first and third half wave voltages; and a discharge circuit for permitting said signal control condensor to be discharged through the gate-cathode circuit of said signal control thyristor.

2. An ignition system as defined in claim 1, wherein said discharge circuit has a time constant which allows a current sufficient to turn on at least said signal control thyristor when said third half wave voltage is generated to flow through said gate-cathode circuit of said signal control thyristor.

3. An ignition system as defined in claim 2, wherein said time constant is determined to allow said signal control condensor to be charged to the degree that said signal control thyristor cannot be turned on before the next first half wave voltage is generated from said exciter coil, when the engine speed is below a predetermined level.

4. An ignition system as defined in claim 2, wherein said time constant is determined to allow charge to remain in said signal control condensor which is sufficient to permit said signal control thyristor to be turned on when the next first half wave voltage is generated from said exciter coil, in the case that the engine speed is above the predetermined level.

5. An ignition system as defined in claim 1 further comprising a reset circuit which allows said signal control condensor to be completely discharged when said signal control thyristor is turned on.

6. An ignition system as defined in claim 5, wherein said reset circuit comprises a semiconductor switch circuit for short-circuiting both ends of said signal control condensor when said signal control thyristor is turned on.

7. An ignition system of the condensor-discharge type for an internal combustion engine, comprising:

an ignition coil having a primary winding and a secondary winding;

an exciter coil arranged in a magneto which is adapted to be rotated in synchronism with the rotation of an internal combustion engine, said exciter coil being adapted to generate output voltages each comprising a half wave voltage of negative polarity, a half wave voltage of positive polarity and a half wave voltage of negative polarity in sequence at predetermined angular intervals when said engine is rotated in the positive direction and generate output voltages each comprising a half wave voltage of positive polarity, a half wave voltage of negative polarity and a half voltage of positive polarity in sequence at predetermined intervals when said engine is rotated in the reverse direction;

an ignition energy accumulating condensor arranged between said pimary winding of said ignition coil and said exciter coil to be charged to have one polarity by said half wave output voltage of positive polarity generated from said exciter coil;

a discharge control thyristor provided to allow said ignition energy accumulating condensor to be discharged through said pirmary winding of said ignition coil when it is turned on;

a turn-on signal supply circuit for supplying a turn-on signal to said thyristor by means of said half wave voltage of negative polarity at the ignition position of said engine;

a signal control condensor adapted to be charged to have one polarity by said half wave voltage of positive polarity generated from said exciter coil;

a signal control thyristor provided to substantially short-circuit the output terminals of said exciter coil when it is turned on and adapted to allow the anode-cathode circuit thereof to be biased in the forward direction by said half wave voltage of negative polarity; and a discharge circuit for permitting said singal control condensor to be discharged through the gate-cathode circuit of said signal control thyristor.

8. An ignition system as defined in claim 7, wherein said discharge circuit has a time constant determined to allow a discharge current sufficient to turn on said discharge control thyristor to be supplied to said gate-cathode circuit of said thyristor when said half wave voltage of negative polarity is generated after said half wave voltage of positive polarity has been generated and decrease said discharge current to a level insufficient to turn on said discharge control thyristor before the next half wave voltage of negative polarity is generated from said exciter coil.

* * * * *